May 16, 1939.  H. E. WARREN  2,158,888

SYNCHRONIZED ESCAPEMENT CLOCK

Filed Dec. 19, 1934

Inventor:
Henry E. Warren
by Harry E. Dunham
His Attorney.

Patented May 16, 1939

2,158,888

UNITED STATES PATENT OFFICE 2,158,888

SYNCHRONIZED ESCAPEMENT CLOCK

Henry E. Warren, Ashland, Mass., assignor to Warren Telechron Company, Inc., Ashland, Mass., a corporation of Massachusetts Application December 19, 1934, Serial No. 758,304

4 Claims. (Cl. 58—26)

My invention relates to timing devices such as clocks of the type wherein the rate of operation of a spring driven clock is compared with the rate of operation of a synchronous motor and the latter is employed when in operation to synchronize the spring driven clock. The synchronous motor may wind the spring of the spring driven clock and the latter has sufficient reserve and accuracy to maintain reasonably correct time over expected periods of failure in the alternating-current supply to which the synchronous motor is connected.

According to the present invention, the spring clock is provided with a balance wheel type of escapement and the balance wheel is so controlled by a resilient member operated from the synchronous motor to increase or decrease the rate of the escapement and bring it into a rate of operation which is synchronous with that of the motor. This controlling action is accomplished by brief interfering collisions between the balance wheel and resilient member but, should the synchronous motor stop, the resilient member always comes to rest out of contact with the balance wheel so that the latter is not interfered with but operates at its own time-keeping accuracy in case of and during failure of the alternating-current supply. The controlling arrangement is extremely simple and may be applied at small expense to existing balance wheel escapement clocks.

Figure 6:
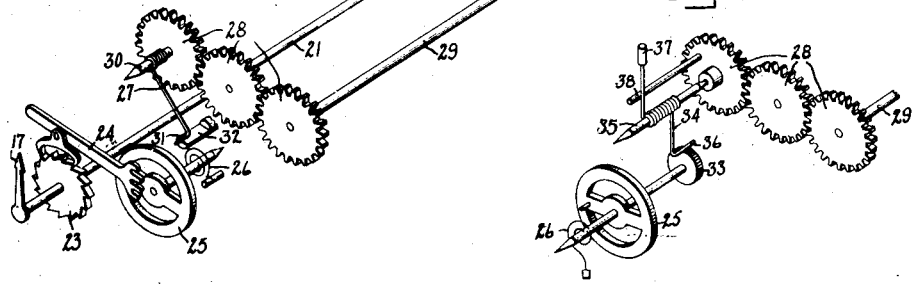
Figure 7:
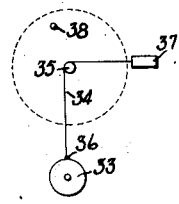

The features of my invention which are believed to be novel and patentable will be pointed out in the claims appended hereto. For a better understanding of my invention, reference is made in the following description to the accompanying drawing showing in Fig. 1 a perspective view of a spring driven balance wheel escapement clock equipped with my invention where the clock spring is wound by the synchronous motor that controls the escapement; Figs. 2 to 5, inclusive, illustrate different operating conditions of the resilient synchronizing device of Fig. 1 and its relation to the balance wheel; and Figs. 6 and 7 show modified forms of a synchronizing device that may be used.

Figure 1:
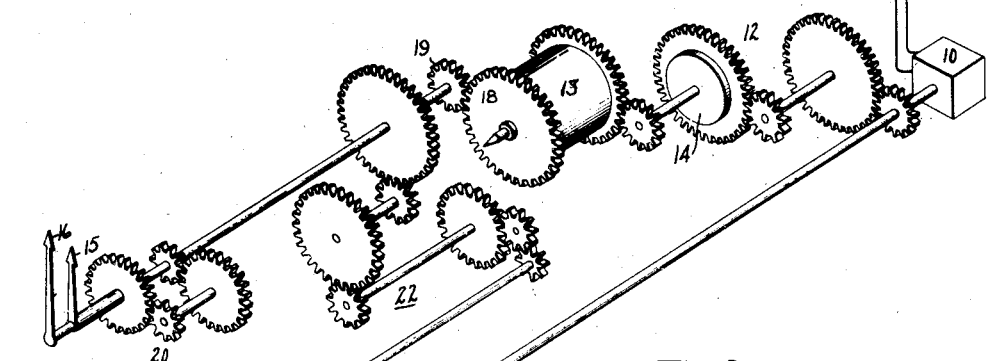

Referring now to Fig. 1, 10 represents a self-starting synchronous motor which is connected to a regulated frequency source of supply 11. This motor is connected through a gear train 12 to one end of a clock spring at 13 and serves normally to maintain the spring in a wound condition. Preferably, the motor, when running at its proper rate, winds the spring at a slightly faster rate than it unwinds and provision is made, as by a friction clutch represented at 14, to allow the winding drive to slip when the spring is substantially fully wound to prevent overwinding of the spring or of a slowing down of the synchronous motor.

The spring at 13 is connected through gears 18 and 19 to a suitable train leading to a timing device, such as the hour, minute, and second hands 15, 16, and 17 of a clock. The usual back gears for the hour hand are represented at 20 and the gear train leading to the second-hand shaft 21 is represented at 22. A balance wheel type of escapement consisting of escape wheel 23, verge lever 24, balance wheel 25, and control spring 26 is driven from shaft 21 and serves to control the rate of the clock as driven by the spring 13 in the usual way except when its action is modified by the synchronizing device now to be described.

The synchronizing device consists of a spring finger 27 which is rotated through a gear train 28 and shaft 29 from the synchronous motor 10. The spring finger 27 consists of a spring wire secured to and coiled about the shaft 30 of the last gear 28 and has a radially extending portion with its outer end 31 bent forward to extend at right angles into the plane of balance wheel 25. The axis of rotation of the spring finger and of balance wheel are parallel and spaced apart such that the end 31 of the spring finger lightly touches the upper periphery of balance wheel 25 as the finger rotates past the balance wheel. Finger 27 rotates in a clockwise direction as here represented although this is immaterial. The shaft 30 to which finger 27 is secured is, of course, driven at a uniform speed by the synchronous motor and, when the motor 10 and the balance wheel 25 are operating at their correct rates, spring finger 27 makes one rotation in some synchronous relation with the period of oscillation of the balance wheel. In other words, a synchronous relation exists between the cycles of operation of these parts. In order to give a practicable example, but not in the way of limiting the invention, it may be stated that spring finger 27 rotates at one revolution per second and the balance wheel makes two complete oscillations per second when both are operating at their correct rates. The outer end of spring finger 27 does not move at a uniform rate but its average rate of rotation is constant. There is provided a stationary pin or abutment 32 in the path of rotation of the outer end 31 of spring finger 27 against which the spring finger comes shortly before it reaches the balance wheel. The pin 32 holds the outer end of the spring finger 27 relatively stationary for a portion of a revolution of the driving shaft 30 which causes a certain amount of winding up of the spring about shaft 30 and a corresponding reduction in the length of the radially extending portion of the spring. This action continues until the spring arm has been deformed sufficiently for it to spring by pin 32. It then snaps past the periphery of the balance wheel 25 at a relatively high rate of speed, and in doing so, momentarily collides with the balance wheel.

Figure 2:
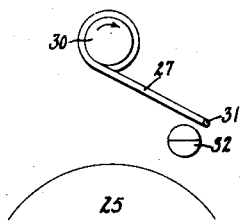
Figure 3:
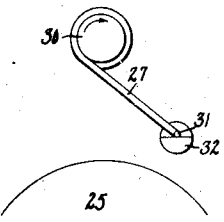
Figure 4:
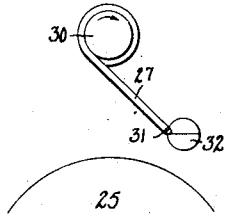
Figure 5:
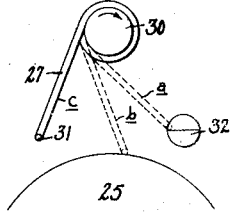

The relationship of these parts and the action of the spring finger is more fully illustrated in Figs. 2 to 5, inclusive. In Fig. 2, the end 31 of the spring finger is approaching stationary pin 32. In Fig. 3, contact has been made, the end 31 of the finger is being held relatively stationary while shaft 30 continues to revolve, tensioning and shortening the spring finger. Fig. 4 represents the condition where the spring is about to snap past the obstruction, it having been held here during nearly ¼ revolution of shaft 30. Fig. 5 shows in full lines the approximate position of the spring 31 at the end of the snap action from which position it rotates uniformly with shaft 30 until it again contacts with obstruction 32.

As indicated in dotted lines in Fig. 5, when the finger 27 snaps from position $a$ to position $c$, it momentarily collides with the balance wheel 25 at approximately position $b$ and rapidly passes on to position $c$. This collision is not severe and the resiliency of the finger allows of its endwise displacement so as to pass by the balance wheel without difficulty. The collision may, however, have a tendency to modify the rate of oscillation of the balance wheel, depending upon its phase position at the time of the collision.

It will be noted that the pin 32 has a flat contact surface so that, by rotation of the pin, the time during which the free rotation of the spring is interfered with can be adjusted. Such adjustment will, of course, vary the tension of the spring at the instant of its release and the speed at which it collides with the balance wheel and may be used as a means of adjusting the device in this respect.

The spring wire 27 may be of phosphor bronze of about .005 of an inch in diameter with a lever arm of the order of one-half inch.

It will be evident that the finger 27 imparts small periodic impulses to the balance wheel 25 when the synchronous motor is in operation but that, should the synchronous motor stop in any position, the finger 27 will come to rest out of contact with the balance wheel due to this lost-motion arrangement so that there is no interference with the escapement mechanism of the spring driven clock and it then operates in a normal manner at its usual accuracy.

It is a fact that, when small periodic impulses are imparted to an oscillating member like a balance wheel as above described, if these impulses have the same frequency or a submultiple of the frequency of the oscillating body, the effect of the impulses tends to change the rate of the oscillating body, increasing or diminishing that rate according to the phase relation between the impulses and the oscillating body. If the phase relation is such that the impulse opposes the force which tends to restore the oscillating body to its midposition, that is to say, has the effect of reducing the restoring force which, in this case, is the tension of control spring 26, the frequency of vibration will be decreased and the clock rate will be reduced. On the other hand, if the impulses are provided in such phase relation that they are in the same direction as the restoring force of the oscillating body, the rate will be accelerated and the clock will tend to run faster. In consequence of these facts, the apparatus described operates to synchronize the escapement as required to cause it to operate at a rate determined by the synchronous motor 10 when the latter is in operation.

This operation may be described as follows:

Collisions occur one each second as the spring finger 27 snaps past the balance wheel. When the motor is first started into operation, the first collision may occur in any phase relation between the colliding parts with the parts moving in the same or opposite directions. If the tendency of the balance wheel is to be slightly fast and the collision occurs at a time to oppose the restoring force of the hair spring 26 with the parts moving in the same direction, the rate of the balance wheel will be reduced and each succeeding impulse will come at a later phase of the balance wheel until the phase position of the latter has been retarded so that the impulses occur near the instant in time when the balance wheel is passing its midposition. As this relation is approached, the impulses have less and less effect until a condition of equilibrium is reached where the normal fast rate of the balance wheel is exactly corrected on the average by periodic impulses from the member 27.

For each different error in the normal rate of the balance wheel, it will have a different phase position when such equilibrium and correction in its rate have been established. If there is no error in the normal rate of the balance wheel, the impulses will come exactly as the balance wheel is passing through its midposition when there will be no tendency of the impulses to change its rate.

If the balance wheel's normal rate is slow instead of fast, the contact phase position will occur so that the impulse force will be added to the restoring force of the balance wheel, which will increase its rate until the condition of equilibrium is established and the average rate of the balance wheel is synchronous with the impulses and with the frequency of the alternating current supplied to the synchronous motor. Generally the contact between the balance wheel and spring finger will occur when the contacting surfaces are moving in the same direction, because if the contact initially occurs when these parts are moving in the opposite direction, the tendency is quickly to shift the phase relation of the balance wheel until the collisions do occur at a time when the parts are moving in the same direction and then synchronizing regulation takes place as above explained.

The scheme does not require any exact adjustment of the synchronizing device or of the normal rate of the escapement. The impulses imparted to the balance wheel should preferably be very feeble, not because this is essential for synchronization but because feeble impulses produce less shock and wear on the delicate parts of the escapement mechanism. An ordinary escapement clock may be set to run at its fastest or slowest rate and be perfectly synchronized by means of this invention. It will be noted that, if the synchronous motor 10 stops due to a failure in the source of supply, the synchronizing device 21 does not then interfere with the normal operation of the escapement because it cannot stop in a position to rest against the balance wheel 25.

In Fig. 6, I have represented another modification of the invention which I have found to operate very satisfactorily. In Fig. 6, the synchronizing impulse device strikes against the periphery of a wheel 33 on the same shaft as the balance wheel and which, therefore, may be considered as a part of the balance wheel. The peripheral surface of wheel 33 may be knurled slightly. The synchronizing device consists of a spring 34 having its middle portion bent about a shaft 35. One end of the wire extends in a radial direction and has a bent end 36 that makes slight contact with the periphery of wheel 33 as the end 36 is rotated past this wheel. The other end of the wire also extends in a radial direction and carries a small weight 37 at its outer end. A finger 38, extending from the side of a gear wheel 28 driven from the synchronous motor as in Fig. 1, is arranged to drive the wire 34 with the shaft 35 in a clockwise direction. The middle portion of the wire 34 may be secured to shaft 35 and the latter is free to turn independently of gear 28. This constitutes a lost-motion-driving connection between gear 28 and wire 34.

The weight 37 on the wire 34 is so arranged that, just about the time the part 36 contacts with wheel 33 to impart an impulse thereto, weight 37 reaches the vertical position above shaft 35 so that, immediately after the impulse is imparted to wheel 33, the impulse assembly consisting of wire 34 and shaft 35 is unbalanced and gravity causes this assembly to quickly rotate ahead of driving pin 38 and come to rest with part 36 well away from wheel 33. Driving pin 38, which rotates at constant speed, then overtakes the wire and again drives it into approximately the position shown in the drawing, ready for another impulsing operation.

This lost-motion-driving connection, which may take various forms, assures that, in case the synchronous motor stops, the impulse part 36 will not come to rest in contact with wheel 33 and interfere with normal clock escapement operation while the synchronous motor is stopped. The motion of the escapement alone will carry the wire past the dead center position in case the synchronous motor stops just as contact is made between parts 36 and 33. The impulse imparted to wheel 33 may come while wire 34 is being driven through the overbalanced position by the synchronous motor, or the impulse may come at about the center of the gravity stroke such that the impulse force is due to gravity acting on weight 37, in which case the wire 34 would be bent into the form shown in Fig. 7.

It will be understood that the lost motion connection between the synchronous motor and impulse member may take a variety of forms so long as the arrangement is such that the impulse device cannot come to rest in a position to interfere with the escapement in case the synchronous motor stops in any position. Also, the movement of the impulsing device past the periphery of the balance wheel or its equivalent at the time of the impulse should be as fast or faster than the movement of the contacting surface of the balance wheel, itself, at the middle of its oscillation. The impulsing device should in all cases have a rate of operation which is synchronous with the rate of the balance wheel when the latter is correct where synchronous is used in the broad sense to include one or more complete oscillations per impulse.

What I claim as new and desire to secure by Letters Patent of the United States is:

1. A timing device, an energy storage motor for driving said timing device, an escapement mechanism having an oscillatory part for controlling the rate of operation of said timing device, a synchronous motor, a shaft rotated by said synchronous motor, a resilient arm secured to and extending radially from said shaft, a stop member positioned to engage the extremity of said arm at one point of its rotation and to momentarily hold it while its driving shaft continues to rotate for a portion of a revolution, thereby storing energy in the resilient arm and deforming it so that it snaps past the stop and forward said portion of a revolution, said resilient arm being positioned adjacent the oscillating part of said escapement mechanism such that momentary contact is made between the extremity of said arm and the oscillating part during the forward snapping movement of said arm to impart a rate-correcting impulse to said oscillatory part, said part having a period of oscillation when correct which is synchronous with the average rate of rotation of said arm.

2. In a mechanism of the class described, a balance wheel, a synchronous motor, a control wheel driven from said motor, and a spring anchored at one end to said control wheel and having its opposite end free, the free end of said spring moving in the path of the periphery of said balance wheel and being adapted to brush against the periphery of the balance wheel for giving a slight forward impulse to the balance wheel in synchronous time.

3. In a mechanism of the class described, a balance wheel, a synchronous motor, a control wheel driven from said motor, a spring anchored at one end to said control wheel and having its opposite end free, the free end of said spring moving in the path of the periphery of said balance wheel and being adapted to brush against the periphery of the balance wheel for giving a slight forward impulse to the balance wheel in synchronous time, and means located in the path of travel of the free end of said spring and in advance of the balance wheel for releasably engaging and periodically retarding the same.

4. In a mechanism of the class described, a balance wheel, a synchronous motor, a control wheel driven by said motor, a coil spring anchored at one end upon said control wheel and having its opposite end free, said opposite end being bent outwardly to provide a hook adapted to travel in the path of the periphery of said balance wheel, and means located in the path of travel of said hook for periodically releasably engaging and slightly retarding the movement of the free end of the spring whereby the free end of the spring will be pulled loose from said means as the control wheel continues to rotate and snap around by its own tension past the balance wheel to produce a brushing action thereagainst and give a slight forward impulse to the balance wheel in synchronous time, thus preventing the free end from stopping against the balance wheel, when current is cut off.

HENRY E. WARREN.